United States Patent [19]

Zweigle

[11] 4,096,133

[45] * Jun. 20, 1978

[54] METHOD FOR QUATERNIZING POLYMERS OF WATER-SOLUBLE AMINOVINYL MONOMERS

[75] Inventor: Maurice L. Zweigle, Midland, Mich.

[73] Assignee: The Dow Chemical Company, Midland, Mich.

[*] Notice: The portion of the term of this patent subsequent to May 17, 1994, has been disclaimed.

[21] Appl. No.: 772,872

[22] Filed: Feb. 28, 1977

Related U.S. Application Data

[63] Continuation-in-part of Ser. No. 618,650, Oct. 1, 1975.

[51] Int. Cl.$^2$ ............................................. C08F 8/44
[52] U.S. Cl. .................. 260/79.3 R; 210/54; 526/23; 526/46; 526/54
[58] Field of Search ............... 260/79.3 R; 526/46, 526/54

[56] References Cited

U.S. PATENT DOCUMENTS

| | | | |
|---|---|---|---|
| 3,166,540 | 1/1965 | Melamed et al. | 260/89.7 N |
| 3,758,445 | 9/1973 | Cohen et al. | 260/89.7 N X |
| 3,840,504 | 10/1974 | Keim | 526/46 |
| 3,842,054 | 10/1974 | Keim | 526/46 |
| 3,859,212 | 1/1975 | Smalley et al. | 210/54 C |
| 3,897,333 | 7/1975 | Field et al. | 260/89.7 N X |
| 3,910,862 | 10/1975 | Barabas et al. | 526/46 |
| 3,934,595 | 1/1976 | Dermain et al. | 526/46 |
| 3,988,503 | 10/1976 | Ariyoshi et al. | 526/46 |
| 4,024,328 | 5/1977 | Zweigle | 526/54 |

*Primary Examiner*—William F. Hamrock

[57] ABSTRACT

In the preparation of polyquaternary ammonium salts by alkylation of polymers of water-soluble ethylenically unsaturated amines such as a dialkylamino methacrylamide with a quaternizing agent such as an alkyl halide in an aqueous solution of the polymer, more rapid and complete alkylation is obtained when the reaction is carried out in an acidic medium containing a lower alkanol such as methanol.

14 Claims, No Drawings

METHOD FOR QUATERNIZING POLYMERS OF WATER-SOLUBLE AMINOVINYL MONOMERS

CROSS-REFERENCE TO RELATED APPLICATION

The present application is a continuation-in-part of my previous application Ser. No. 618,650 filed Oct. 1, 1975.

BACKGROUND OF THE INVENTION

This invention relates to methods for the preparation of polyquaternary ammonium salts.

British Pat. No. 887,900 and U.S. Pat. No. 3,256,140 teach the usefulness of various quaternary aminomethyl substituted acrylamide polymers for several purposes in the manufacture of paper. These references show the preparation of such polymers by the homopolymerization or copolymerization of monomeric quaternary aminomethyl substituted acrylamide or methacrylamide. This process requires the preparation and isolation of the expensive quaternary monomer and does not lend itself to commercial practice. Further, the quaternary monomer does not lend itself to the preparation of the relatively high molecular weight acrylamide polymers, which have been found desirable for use as flocculating agents.

U.S. Pat. No. 3,859,212 teaches that certain acrylamide polymers containing aminomethyl groups have desirable properties as flocculating agents and are rendered more stable by converting the aminomethyl groups to the quaternary form. However, it has been found that the methods for preparing the polyquaternary ammonium compounds, as taught in the prior art, are not adapted to commercialization. Thus, for example, when quaternization was attempted at practical concentrations of polymer in an alkaline aqueous medium the polymer formed a thick gel prior to completion of the quaternization reaction, said gel being so viscous as to render it difficult or impossible to apply same as a flocculating agent or paper treating chemical. On the other hand, when it was attempted to carry out the reaction at an acidic pH in aqueous medium it was found that the reaction proceeded so slowly that little or no product could be obtained within a reasonable time.

It would therefore be desirable and is an object of the present invention to provide a method for preparing quaternary ammonium derivatives of polymers of water-soluble ethylenically unsaturated amines rapidly and in good yield.

SUMMARY OF THE INVENTION

In accordance with the present invention it has been discovered that the quaternization of polymers having polyethylenic backbones and a plurality of pendant tertiary amino groups (hereinafter called an amine polymer) can be carried out rapidly and smoothly in an acidic aqueous medium provided that a small catalytic amount of a water-soluble alcohol is added to the reaction medium. The resulting polyquaternary ammonium polymer is inherently water-dispersible and preferably water-soluble. By "an inherently water-dispersible polymer" is meant that the polymer will form a stable aqueous dispersion or solution without the aid of an external surfactant when stirred in water. It is among the advantages of this novel method that substantially all of the pendant amino groups of the amine polymer can be readily converted to the quaternary ammonium form if such total conversion is desired. It is a further advantage that the reaction proceeds in the presence of the catalytic alkanol without the formation of thick gels in the reaction product.

DETAILED DESCRIPTION OF ILLUSTRATIVE EMBODIMENTS

The method of this invention is suitably employed to quaternize any inherently water-dispersible polymer having a polyethylenic backbone and a plurality of pendant tertiary amino groups.

Preferably such amine polymers are polymers of water-soluble amines such as N-aminoalkyl substituted ethylenically unsaturated amides, e.g., N-(dialkylaminomethyl)acrylamides and N-(dialkylaminomethyl)methacrylamide preferably wherein alkyl is methyl or ethyl, N-(piperidylmethyl)acrylamide and others such as N-[(di-$\beta$-hydroxyethyl)aminomethyl]-acrylamide; dialkylaminoesters of unsaturated carboxylic acids, e.g., diethylamino-ethyl acrylate, dimethylamino ethyl acrylate and dimethylaminoethyl methacrylate; vinyl pyridine; allyl and diallyl amines, e.g., diallylbenzylamine, diallylethylamine and diallylmethylamine. Most preferably such amine polymers are water-soluble.

In addition to homopolymers and copolymers of the aforementioned amines, copolymer of the amines with other water soluble monomers are also advantageously employed in the practice of this invention. Additional water-soluble monomers which may be copolymerized with one or more of the aforementioned amines include hydroxyalkyl esters of ethylenically unsaturated carboxylic acids such as the hydroxyethyl and hydroxypropyl esters of acrylic and methacrylic acid; sulfoalkyl esters of ethylenically unsaturated carboxylic acids such as 2-sulfoethyl methacrylate; ethylenically unsaturated carboxylic acids such as acrylic acid and methacrylic acid including the water-soluble salts thereof such as sodium acrylate and ammonium acrylate; ethylenically unsaturated amides such as acrylamide, methacrylamide and the like; vinylbenzyl sulfonic acid; vinyl benzylammonium salts; ethylenically unsaturated nitriles such as acrylonitrile and fumaronitrile; and other similar water-soluble, ethylenically unsaturated monomers. Usually such additional water-soluble monomers constitute no more than about 70 weight percent of total monomer, preferably less than about 40 weight percent.

It is further understood that rather small proportions, i.e., up to about 15 weight percent, preferably less than about 10 weight percent, based on total monomer weight of water-insoluble monomers which are copolymerizable with the water-soluble monomer(s) are optionally present in the amine polymer suitably employed herein. Examples of such water-insoluble monomers include alkyl esters of ethylenically unsaturated carboxylic acids such as ethyl acrylate; vinyl and vinylidene halides such as vinyl chloride and vinylidene chloride; monovinylidene aromatics such as styrene; vinyl alkyl ethers; and the like.

In addition, if crosslinked amine polymers are desired, a crosslinking monomer which is generally a copolymerizable polyethylenically unsaturated monomer may be employed. Examples of such suitable polyethylenically unsaturated crosslinking monomers include divinylarylsulfonates; diethylenically unsaturated diesters such as ethylene glycol diacrylate; diethylenically unsaturated esters and ethers such as diallyl ethylene glycol ether, divinyl ether and allyl acrylate; and N,N'-alkylidene-bis(ethylenically unsaturated amides) such as N,N'-methylene-bis-methacrylamide. Of the aforementioned crosslinking monomers, the bisamides are preferred. Normally when used, such crosslinking monomers are employed in amounts to provide the degree of crosslinking desired. Generally, such amounts range from about 10 to about 30,000 weight parts, preferably from about 10 to about 2,000 weight parts, of crosslinking monomer per million weight parts of total monomer.

The acrylamide polymers, employed in preparing the Mannich bases which are especially preferred amine polymers in the process of the present invention, are well known and may be homopolymers of acrylamide or copolymers of acrylamide with up to about 30 mole percent of a compatible water-soluble monomer, such as acrylic or methacrylic acid or their salts. The Mannich bases are generally prepared from an aqueous solution of acrylamide polymer by the addition of formaldehyde and a secondary amine, preferably a dialkyl amine. Dialkyl amines having from 1 to 4 carbon atoms in their alkyl groups may be employed although dimethyl amine or diethyl amine is usually preferred. The formaldehyde and dialkyl amine are usually employed in equimolar proportions to each other or with a slight molar excess of the amine and are employed in an amount to convert the desired proportion of carboxamide groups on the polymer to the dialkylaminomethyl Mannich derivative. Useful quaternary ammonium salts may be prepared from acrylamide polymers having from about 20 to 100 percent of their carboxamide groups so modified.

In quaternization of the amine polymer, the amine polymer is generally prepared in a relatively dilute aqueous solution and such products as commercially available are generally strongly alkaline having a pH in the range of from 10 to 11. In the practice of the method of this invention, it is generally desirable to add an acid, such as a mineral acid or an organic acid, to the solution of starting material to adjust the pH thereof to a pH value of 7 or less, preferably a pH value from about 2 to about 6.5, more preferably from about 4 to about 6.5, prior to carrying out the quaternization reaction.

The amount of amine polymer to be employed in the reaction mixture will vary depending upon the molecular weight of the amine polymer concerned. Thus, for example, with the N-(dialkylaminomethyl) derivatives of polyacrylamides having weight average molecular weights (Mw) of from about 100,000 to 300,000 the polymer solids in the reaction mixture may be from about 20 percent by weight up to about 40 percent by weight. On the other hand with the N-(dialkylaminomethyl) derivatives of polyacrylamides having Mw of 1 million or more including those having Mw of 30 million and higher, it is generally desirable to employ a solution of 5 percent by weight or less of the polymer in order to avoid excessive viscosity in the reaction medium. Alternatively in order to avoid the aforementioned limitations on amine polymer concentration, the amine polymer is advantageously prepared in the form of a water-in-oil emulsion wherein the amine polymer resides in the aqueous phase. This water-in-oil emulsion thus provides the necessary reaction medium for carrying out the quaternization reaction. The oil phase is suitably any inert water-insoluble organic liquid such as a hydrocarbon. Optionally, from about 5 to 10 percent by weight of a neutral salt, such as sodium chloride or sodium sulfate, may be added to the reaction medium containing the aqueous solution of amine polymer either prior to or during the alkylation reaction to reduce the viscosity thereof.

While the order of addition of the reactants and catalyst is not critical, it is generally desirable to add a catalytic amount of a water-soluble alcohol, preferably a water-soluble alkanol containing from 1 to 4 carbon atoms, to the reaction mixture prior to addition of the quaternizing agent. For the purposes of this invention, the alcohol is sufficiently water-soluble if an amount equivalent to a catalytic amount for purposes of the quaternization reaction will dissolve in water. Exemplary preferred alcohols include methanol, ethanol, 1- and 2-propanol, and 1- and 2-butanol. Other suitable alcohols include water soluble polyols including diols such as alkylene glycols such as ethylene glycol and the other water-soluble organic compounds containing at least one alcoholic hydroxyl group and any other group or groups which are inert in the quaternization reaction.

Only a small catalytic amount of the alcohol is required and this amount can be predetermined by a trial reaction. In general good results have been obtained when employing from about 5 to 15 percent by weight, preferably about 10 percent by weight, of the alcohol based on the weight of polymer in the reaction mixture. Excessive amounts of alcohol can precipitate the polymer from the aqueous solution and it is therefore generally desirable to employ no more than about 10 percent of alcohol by weight based on the total weight of the reaction mixture. Moreover in instances wherein the amine polymer is the Mannich derivative of an amide polymer prepared by the reaction of the amide polymer with an amine and formalin which contains methanol or similar alkanol, no additional alcohol catalyst need be added to the Mannich reaction mixture for the desired quaternization to occur.

The reaction mixture is heated to a reaction temperature and contacted with the desired amount of quaternizing agent. The preferred quaternizing agents for use in the invention are alkyl chlorides and preferably primary alkyl chlorides, such as methyl chloride, ethyl chloride, normal propyl chloride, normal butyl chloride or isobutyl chloride. For ease of handling and ready reactivity methyl chloride and ethyl chloride are the preferred alkylating agents. However, because of the low boiling points of these materials, it is necessary to carry out the reaction in a pressure vessel under elevated pressure when employing methyl chloride or ethyl chloride. Other suitable quaternizing agents include dialkyl sulfates, preferably those having 1 to 2 carbons such as dimethyl sulfate, and diethyl sulfate; epihalohydrins, preferably those having 3 to 8 carbons, such as epichlorohydrin and halogenated styrene oxides such as ar-chlorostyrene oxide; alkyl dihalides and trihalides such as dichloroethane and trichloroethane, aryl halides such as chlorobenzene, dichlorobenzene and trichlorobenzene. Any desired amount of quaternizing agent can be employed depending upon the degree of quaternization required. In most cases, it is preferred to employ a slight excess of quaternizing agent over the stoichiometric amount required to convert all the amino groups in the starting polymer to the quaternary form.

The reaction temperature and pressure of the quaternization reaction is not critical and is suitably any temperature and pressure that permits the reaction to proceed. The reaction is preferably carried out at temperatures of from about 25° C up to the boiling point of the reaction mixture and is most preferably carried out at a temperature in a range of from about 60° to 70° C. Depending on the quaternizing agent and reaction temperature employed, reaction pressure may vary from ambient to 200 psig or more.

The following examples illustrate the invention but are not to be construed as limiting the same.

EXAMPLE 1

A N-dimethylaminomethyl-polyacrylamide employed as a starting material was prepared by the Mannich reaction from a polyacrylamide, having a molecular weight of about 300,000 and having about 5 percent of its original carboxamide groups hydrolyzed to sodium carboxylate groups, said reaction being carried out by heating an aqueous solution of the polyacrylamide with stoichiometric amounts of formaldehyde and dimethylamine to convert about 90 percent of the amide groups to the N-dimethylaminomethyl form.

300 Grams of an aqueous solution of this N-dimethylaminomethyl derivative of polyacrylamide containing 78 grams (0.72 mole) of the latter was placed in a pressure vessel equipped with a stirrer and gas inlet and 15 grams of sodium chloride and 8 grams of methanol were dissolved therein. The resulting solution was acidified to pH 6.3 with sulfuric acid, the pressure vessel was closed and 80 grams of methyl chloride was added. The reaction vessel and contents were heated at temperatures of 62°-65° C for a period of about 3 hours. The pressure vessel was vented, cooled to room temperature and opened. The product was a clear liquid, no more viscous than the starting polymer solution, and did not gel on storage. Titration of an aliquot of the product showed that substantially all of the dimethylamino groups in the starting polymer had been converted to trimethyl-quaternary-ammonium chloride groups. A dilute solution of the product was found to be an excellent flocculating agent, for example, on raw sewage solids.

When the foregoing procedure was carried out in exactly similar fashion except that no methanol was added to the reaction mixture, the quaternization reaction did not occur to a detectible extent.

EXAMPLE 2

A polyacrylamide, having a molecular weight in the range of one to two million and having about 7 percent of its original carboxamide groups hydrolyzed to carboxyl groups was dissolved in water and reacted with formaldehyde and dimethylamine to produce an N-dimethylaminomethyl derivative having about 90 percent of its amide groups bearing the N-dimethylaminomethyl moiety. To 300 grams of the resulting solution, containing 15 grams (about 0.14 mole) of the N-dimethylaminomethyl acrylamide polymer, were added 15 grams of sodium chloride and sufficient concentrated sulfuric acid to bring the solution to a pH of 6.4. Two grams of methanol was added to the above solution and the resulting mixture was placed in the stirred pressure vessel of Example 1. The vessel was closed and 11 grams of methyl chloride was added through the gas inlet tube. The reaction vessel and contents were heated to 64° C with stirring at 50 revolutions per minute and under a pressure of 82 pounds per square inch (gauge). Heating was continued at temperatures of 64°-66° C for a period of 5 hours, during which the pressure in the reaction vessel gradually diminished to 74 psig. The reaction vessel was then cooled and vented. The product was a clear solution having a viscosity of 600 centipoises at 25° C as determined with a Brookfield viscometer using the No. 5 spindle at 20 rpm. This product was found to contain 6.5 percent by weight of polymer solids and titration of an aliquot thereof showed substantially complete quaternization of the dimethylamino groups. The quaternized polymer had excellent activity in conditioning sewage sludge for dewatering.

When the quaternization reaction was attempted using the same starting polymer and methyl chloride but at a pH of greater than 7.0, the reaction mixture rapidly formed a very viscous gel which resisted stirring and could not be employed as a practical product.

EXAMPLE 3

The procedure of Example 1 is repeated except that 10 grams of tertiary butyl alcohol is substituted for the methanol and 100 grams of ethyl chloride is substituted for the methyl chloride of Example 1 to produce a product consisting of an aqueous solution of acrylamide polymer wherein about 90 percent of the carboxamide groups carry substituents having the formula:

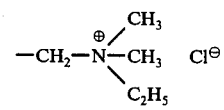

As indicated the quaternary ammonium salts of acrylamide polymers produced in accordance with the present invention are useful at low dosages as flocculants for aqueous suspensions containing organic and/or inorganic suspensoids as, for example, raw sewage, paper mill waste or titanium black liquor. In addition the quaternary products are useful as electroconductive resins for coating paper for reprography and as wet-strength and filler-retention agents in the manufacture of paper.

EXAMPLE 4

142 Grams of a polyacrylamide, as described in Example 1, is dissolved in 568 grams of deionized water and 84 grams of diethyl amine followed by 30 grams of para-formaldehyde are added thereto with stirring. On addition of the formaldehyde an exothermic reaction is initiated and thereafter the reaction mixture is heated at temperatures up to about 40° C for a period of about 3 hours to complete the Mannich reaction whereby about 50 percent of the carboxamide nitrogens in the polyacrylamide carry a diethylaminomethyl group. The resulting solution is placed in a glass reaction vessel equipped with a stirrer, a dropping funnel and a reflux condenser and is acidified with sulfuric acid to a pH of 6. Thirty grams of ethanol and 40 grams of sodium chloride are then dissolved in the above solution and the resulting mixture is heated to 60° C and 83 grams of isobutyl chloride is added thereto dropwise with stirring over a period of 3 hours while maintaining the reaction mixture at temperatures of 60°-65° C under reflux. Titration of the product shows substantial conversion of the diethylamino groups to quaternary isobutyl-diethylammonium chloride groups. The polymer product is useful for the flocculation and flotation of digested sewage sludge.

I claim:

1. In a method for the preparation of an inherently water-dispersible polyquaternary-ammonium derivative of an amine polymer wherein a quaternizing agent is reacted with a inherently water-dispersible polymer having a polyethylenic backbone and a plurality of pendant tertiary amino groups in an aqueous medium, the improvement which comprises adjusting the aqueous medium to a pH of about 7 or less and incorporating therein a catalytic amount of a water-soluble alcohol and contacting said medium with the quaternizing agent.

2. The method of claim 1 wherein the amine polymer is a polymer of an N-dialkyl aminomethyl substituted ethylenically unsaturated amide.

3. The method of claim 2 wherein the amine polymer is a N-dialkylaminomethyl derivative of an acrylamide polymer which is a polyacrylamide on which from 20 to 100 percent of the carboxamide groups carry a dimethylaminomethyl substituent.

4. The method of claim 2 wherein alcohol is an alkanol having 1 to 4 carbons and is employed in the amount of from about 5 to about 15 percent by weight based on the amount of amine polymer in the reaction mixture.

5. The method of claim 4 wherein the reaction is carried out at a temperature of from about 40° C to the boiling temperature of the medium.

6. The method of claim 1 wherein the quaternizing agent is a primary alkyl chloride containing 1 to 4 carbon atoms.

7. The method of claim 1 wherein the quaternizing agent is a dialkyl sulfate wherein alkyl has from 1 to 2 carbons.

8. The method of claim 1 wherein the quaternizing agent is an epihalohydrin which contains 3 to 8 carbon atoms.

9. The method of claim 1 wherein the quaternizing agent is methyl chloride or ethyl chloride and the reaction is carried out at superatmospheric pressure.

10. The method of claim 4 wherein the quaternizing agent is methyl chloride.

11. The method of claim 10 wherein the alkanol is employed in the amount of from about 5 to about 15 percent by weight based on the weight of N-dimethylaminomethyl-acrylamide polymer in the reaction mixture.

12. The method of claim 4 wherein the alkanol is methanol.

13. The method of claim 12 wherein the methanol is supplied from residual formalin remaining from the preparation of the N-dialkylaminomethyl derivative of polyacrylamide by reacting polyacrylamide with formalin and dialkylamine.

14. The method of claim 1 wherein the aqueous solution of amine polymer is dispersed in an oil phase to form a water-in-oil emulsion.

* * * * *